Patented Sept. 6, 1932

1,875,897

UNITED STATES PATENT OFFICE

OTTO STÅLHANE, DONOVAN RAGNAR EFRAIM WERNER, AND STIG GIERTZ-HEDSTRÖM, OF STOCKHOLM, SWEDEN

METHOD FOR TREATING MATERIALS CONTAINING ARSENIOUS ACID

No Drawing. Application filed April 24, 1930, Serial No. 447,102, and in Sweden December 21, 1929.

In the production of concrete of usual cement and/or lime or other basic materials it has been found advantageous to use materials which besides the usual ingredients also contain arsenious acid ($As_2O_3$) or materials containing arsenious acid, as the concrete or the cement thereby will get a greater resisting power against solubility in water.

However, experience has shown that the disadvantage easily arises that, at least in certain cases, the concrete or cement thus obtained hardens too rapidly.

The object of the present invention is to remove said disadvantage.

In mixing arsenious acid or substances containing arsenious acid as for instance by-products, obtained in working arsenious ores with basic substances in solid form for instance lime or other substances in solid form containing bases for instance cement (Portland cement) or with mixtures containing basic substances or bases and thereafter adding water the reaction between the arsenious acid and the basic substances or the substances containing bases will take place comparatively rapidly.

As above mentioned the present invention has for its object a method to retard said reaction and is substantially characterized thereby that the substances in question before the adding of water wholly or in part are subjected to heating and subsequent cooling either before, during or after their intermixture. Said heating and cooling may be carried out with or without intermixture or stirring of the ingredients in an open room or vessel at atmospheric pressure, for instance in a rotary furnace or in a closed vessel (for instance a stationary or rotary autoclave) at another possibly higher pressure.

The temperature to which the material is heated may vary, depending on the kind and rate of moisture of the different substances, the desired rate of retardation of the reaction and other circumstances.

The cooling may be carried out with or without the use of special devices for acceleration or retardation thereof and can take place in the same room as that for the heating or in another room.

In certain cases it may be suitable to change the rate of moisture or the amount of aqueous substances before subjecting the material to the said treatment.

Regarding some substances, for instance Portland cement, it may be found suitable not to add the usual ingredients, for instance gypsum, until said treatment has been carried out.

The method may be carried out in such a way that all or only part of the arsenious acid or the material containing arsenious acid contained in the final mixture are heated and then cooled together with all the material or only part thereof, containing the bases.

For illustrating the invention the following examples are given.

1. A mixture substantially containing about 60 to 70% Portland cement and about 40 to 30% arsenious acid is heated to 200 to 250° C. in a closed rotating container either heated from outside or by introduction of hot gases or by internal combustion of solid, fluent or gaseous fuel. The heating may be carried out by means of electric energy. The mixture is thereafter cooled or left to cool either while still in the furnace or after having been taken out therefrom. By said treatment the reaction may be retarded by adding water or aqueous substances.

2. Portland cement or a mixture of Portland cement and lime—slaked or unslaked—is heated in a rotary furnace and is there brought into contact with hot gases from a roasting furnace, for instance in roasting arsenious ores, containing arsenious acid and either before, during or after the cooling mixed with arsenious acid or substances containing arsenious acid and possibly a desired amount of other substances. The mixture is thereafter cooled or left to cool, as stated in the preceding example, before it is allowed to come into contact with water.

The substances containing arsenious acid (or pure arsenious acid) may wholly or in part consist of by-products, obtained in working arsenious ores, for instance in working such ores for recovering metal, sulphur or compounds thereof.

The basic substances may for instance wholly or in substantial part consist of lime and the substances containing bases may wholly or in substantial part consist of Portland cement or mixtures of Portland cement and lime or of cement containing a greater percentage of lime than the usual Portland cement.

Having thus described our invention we declare that what we claim is:—

1. The method of preparing a material to be used as a cement, from arsenious acid and inorganic basic substances in such a manner as to prevent the cementitious material hardening rapidly when used by mixing with water, consisting in first heating the acid and basic substances, and then causing them to become cool before using and exposing them with water.

2. The method of preparing a cementitious material from arsenious acid and inorganic basic substances in such a manner as to prevent the finished material hardening rapidly when used by mixing with water, comprising first mixing the ingredients with each other, heating same while mixed, then cooling same before using same as a cement in the presence of water.

3. The method of making a plastic article of manufacture which will not harden rapidly, comprising taking a material containing arsenious acid and a material containing inorganic basic substances, heating these ingredients, then cooling the same, and thereafter allowing them to react in the presence of water to form the cementitious article of manufacture which hardens but slowly in making with water.

4. The method of preparing a material to be used as a cement, from arsenious acid and inorganic basic substances, which material will not harden rapidly when mixed with water to form articles of manufacture, consisting in first heating the ingredients with hot gases containing the arsenious acid radical, and then cooling the material thus obtained before using same as a cement.

5. The method of preparing a cementitious material, which will not harden rapidly in the presence of water, from arsenious acid and inorganic basic substances, consisting in first heating the ingredients with hot gases containing the arsenious acid-radical, then cooling the material thus obtained, admixing therewith further substances containing arsenious acid, and cooling the final product before using it as a cement with water.

6. The method of preparing a cementitious material which will not harden rapidly in the presence of water, from arsenious acid and inorganic basic substances, consisting in heating these dry ingredients while mixing, and then allowing same to become cool while continuing mixing.

7. In a method according to claim 1, the step of heating the material containing the arsenious acid together with the inorganic basic substances in a closed container in which the pressure is above atmospheric pressure.

8. In a method according to claim 1, the step in which the material containing the basic substances is roasted with the arsenious acid radical by means of hot gases obtained from roasting arsenious ores.

9. In a method according to claim 1, the employment as the material for supplying the arsenious acid radical, of by-product substances obtained in roasting arsenious ores.

10. In a method according to claim 1, the employment as the basic substance, of a material comprising lime.

11. In a method according to claim 1, the employment as the basic substance, of a material comprising Portland cement.

12. In a method according to claim 1, the employment as the basic substance, of a mixture consisting essentially of lime and Portland cement.

13. In a method according to claim 1, the employment as the basic substance, of a cement containing a higher percentage of lime than does ordinary Portland cement.

In testimony whereof we affix our signatures.

OTTO STÅLHANE.
DONOVAN RAGNAR EFRAIM WERNER.
STIG GIERTZ-HEDSTRÖM.